US012709788B2

(12) United States Patent
Kido et al.

(10) Patent No.: US 12,709,788 B2
(45) Date of Patent: Aug. 18, 2026

(54) CEMENTED CARBIDE AND CUTTING TOOL

(71) Applicant: Sumitomo Electric Industries, Ltd., Osaka (JP)

(72) Inventors: Yasuki Kido, Osaka (JP); Katsumi Okamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 482 days.

(21) Appl. No.: 18/275,621

(22) PCT Filed: Feb. 9, 2022

(86) PCT No.: PCT/JP2022/005185
§ 371 (c)(1),
(2) Date: Aug. 3, 2023

(87) PCT Pub. No.: WO2022/209336
PCT Pub. Date: Oct. 6, 2022

(65) Prior Publication Data

US 2024/0295011 A1 Sep. 5, 2024

(30) Foreign Application Priority Data

Apr. 1, 2021 (JP) ................................ 2021-062900

(51) Int. Cl.
*C22C 29/08* (2006.01)
*B23B 27/14* (2006.01)
(Continued)

(52) U.S. Cl.
CPC ............ *C22C 29/08* (2013.01); *B23B 27/148* (2013.01); *C22C 1/05* (2013.01); *C22C 29/067* (2013.01); *B23B 2222/28* (2013.01)

(58) Field of Classification Search
CPC ................................ C29C 29/08; C22C 29/08
See application file for complete search history.

(56) References Cited

U.S. PATENT DOCUMENTS

2013/0036866 A1* 2/2013 Tamura .................. B22F 3/101 75/240
2018/0222804 A1 8/2018 Kido et al.
(Continued)

FOREIGN PATENT DOCUMENTS

CN 109790596 A 5/2019
CN 112513302 A 3/2021
(Continued)

*Primary Examiner* — Jophy S. Koshy
*Assistant Examiner* — Joshua S Carpenter
(74) *Attorney, Agent, or Firm* — XSENSUS LLP

(57) ABSTRACT

A cemented carbide includes a hard phase and a binder phase, wherein the hard phase has first hard phase grains each composed of tungsten carbide, second hard phase grains including a core portion and a rim portion, a composition of the core portion is represented by $M1_{x1}W_{1-x1}C_{1-y1}N_{y1}$, a composition of the rim portion is represented by $M2_{x2}W_{1-x2}C_{1-y2}N_{y2}$, each of the M1 and M2 is at least one metal element selected from a group consisting of a group 4 element, a group 5 element in a periodic table, chromium and molybdenum, and the binder phase includes at least one iron group element selected from a group consisting of iron, cobalt and nickel, and a 50% cumulative number grain size of the second hard phase grains is 0.01 μm or more and 1.0 μm or less.

11 Claims, 2 Drawing Sheets

(51) Int. Cl.
*C22C 1/05* (2023.01)
*C22C 29/06* (2006.01)

(56) References Cited

U.S. PATENT DOCUMENTS

| | | | |
|---|---|---|---|
| 2020/0048747 A1* | 2/2020 | Michiuchi | C22C 29/08 |
| 2020/0291504 A1 | 9/2020 | Fukae et al. | |
| 2020/0340083 A1 | 10/2020 | Michiuchi et al. | |

FOREIGN PATENT DOCUMENTS

| | | | |
|---|---|---|---|
| EP | 3587609 | A1 | 1/2020 |
| JP | 60-135552 | A | 7/1985 |
| JP | 01-201436 | A | 8/1989 |
| WO | 2017/191744 | A1 | 11/2017 |
| WO | 2019/220533 | A1 | 11/2019 |
| WO | 2020/070978 | A1 | 4/2020 |

* cited by examiner

| 0.0% | 1.9% | 1.9% | 1.9% | 3.8% | 0.0% | 1.9% | 0.0% |
|---|---|---|---|---|---|---|---|
| 1.9% | 1.9% | 0.0% | 1.9% | 1.9% | 1.9% | 0.0% | 0.0% |
| 1.9% | 3.8% | 3.8% | 3.8% | 1.9% | 0.0% | 1.9% | 3.8% |
| 0.0% | 1.9% | 1.9% | 1.9% | 1.9% | 5.8% | 0.0% | 1.9% |
| 3.8% | 1.9% | 3.8% | 3.8% | 1.9% | 3.8% | 1.9% | 1.9% |
| 0.0% | 1.9% | 1.9% | 1.9% | 0.0% | 1.9% | 3.8% | 3.8% |

CEMENTED CARBIDE AND CUTTING TOOL

CROSS-REFERENCE TO RELATED APPLICATIONS

The present application is based on PCT/JP2022/005185, filed Feb. 9, 2022, which claims priority to Japanese Patent Application No. 2021-062900, filed Apr. 1, 2021, the entire contents of each are incorporated herein by reference.

TECHNICAL FIELD

The present disclosure relates to a cemented carbide and a cutting tool.

BACKGROUND ART

Conventionally, a cemented carbide including a hard phase containing tungsten carbide (WC) as a main component and a binder phase containing an iron group element as a main component has been used as a material of a cutting tool. In recent years, a technique has been developed to increase wear resistance and breakage resistance of a cemented carbide by further adding a second hard phase composed of a metal nitride (for example, WO 2017/191744 (PTL 1)).

CITATION LIST

Patent Literature

PTL 1: WO 2017/191744

SUMMARY OF INVENTION

A cemented carbide of the present disclosure is a cemented carbide including a hard phase and a binder phase, wherein

- the hard phase has first hard phase grains and second hard phase grains,
- each of the first hard phase grains is composed of tungsten carbide,
- a second hard phase grain includes a core portion and a rim portion that covers at least a portion of the core portion,
- a composition of the core portion is represented by $M1_{x1}W_{1-x1}C_{1-y1}N_{y1}$,
- the M1 is at least one metal element selected from a group consisting of a group 4 element, a group 5 element in a periodic table, chromium and molybdenum;
- the x1 is 0.70 or more and 1.00 or less,
- the y1 is 0 or more and 0.90 or less,
- a composition of the rim portion is represented by $M2_{x2}W_{1-x2}C_{1-y2}N_{y2}$,
- the M2 is at least one metal element selected from a group consisting of a group 4 element, a group 5 element in the periodic table, chromium and molybdenum,
- the x2 is 0.20 or more and less than 0.70,
- the y2 is 0 or more and 0.90 or less,
- the binder phase includes at least one iron group element selected from a group consisting of iron, cobalt, and nickel, and
- a 50% cumulative number grain size of the second hard phase grains is 0.01 μm or more and 1.0 μm or less.

A cutting tool of the present disclosure is a cutting tool including the above-described cemented carbide.

DETAILED DESCRIPTION

Figure 1:
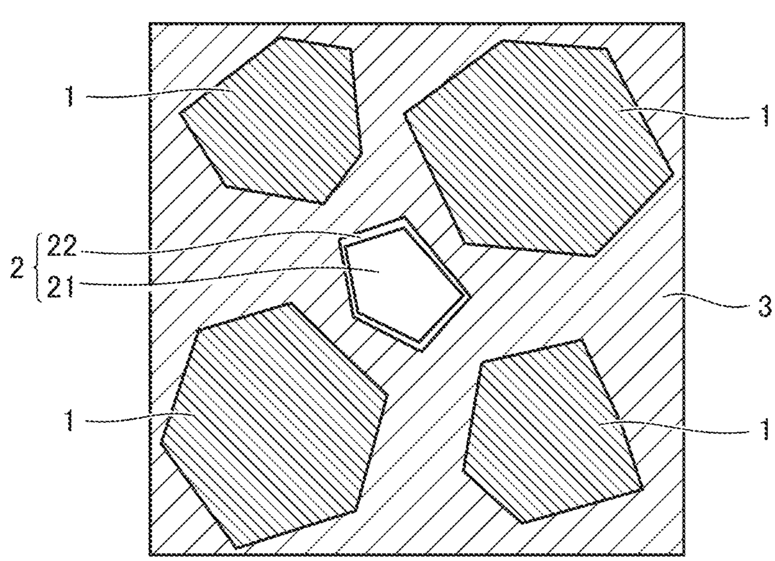
FIG. 1 is a diagram schematically showing a cross section of a cemented carbide according to one embodiment of the present disclosure.

Problem to be Solved by the Present Disclosure

In recent years, it has become more difficult to cut workpieces in cutting processes, and in particular, in the field of small-diameter drills, a cemented carbide having an excellent wear resistance even in high-speed processing have been required.

Thus, it is an object of the present disclosure to provide a cemented carbide having an excellent wear resistance even in high-speed processing when used as a tool material.

Advantageous Effect of the Present Disclosure

The cemented carbide of the present disclosure can have an excellent wear resistance even in high-speed processing when used as a tool material.

DESCRIPTION OF EMBODIMENTS

First, embodiments of the present disclosure will be listed and described.

(1) A cemented carbide of the present disclosure is a cemented carbide including a hard phase and a binder phase, wherein

- the hard phase has first hard phase grains and second hard phase grains,
- each of the first hard phase grains is composed of tungsten carbide,
- a second hard phase grain includes a core portion and a rim portion that covers at least a portion of the core portion,
- a composition of the core portion is represented by $M1_{x1}W_{1-x1}C_{1-y1}N_{y1}$,
- the M1 is at least one metal element selected from a group consisting of a group 4 element, a group 5 element in a periodic table, chromium and molybdenum;
- the x1 is 0.70 or more and 1.00 or less,
- the y1 is 0 or more and 0.90 or less,
- a composition of the rim portion is represented by $M2_{x2}W_{1-x2}C_{1-y2}N_{y2}$,
- the M2 is at least one metal element selected from a group consisting of a group 4 element, a group 5 element in the periodic table, chromium and molybdenum,
- the x2 is 0.20 or more and less than 0.70,
- the y2 is 0 or more and 0.90 or less, the binder phase includes at least one iron group element selected from a group consisting of iron, cobalt, and nickel, and a 50% cumulative number grain size of the second hard phase grains is 0.01 μm or more and 1.0 μm or less.

The cemented carbide of the present disclosure can have an excellent wear resistance even in high-speed processing when used as a tool material.

(2) Preferably, the x1 is 0.80 or more and 1.00 or less, and the x2 is 0.40 or more and less than 0.70, and the 50% cumulative number grain size of the second hard phase grains is 0.01 μm or more and 0.5 μm or less.

With this, the wear resistance of the cemented carbide can be further improved.

(3) Preferably, a 50% cumulative number grain size of the first hard phase grains is 0.1 μm or more and 1.5 μm or less. With this, the wear resistance of the cemented carbide is further improved.

(4) Preferably, the cemented carbide does not include one or both of chromium and vanadium. With this, the wear resistance of the cemented carbide is further improved.

(5) Preferably, the second hard phase grains exist dispersedly. With this, the wear resistance of the cemented carbide is improved.

(6) Preferably, in the cemented carbide, the number of unit regions R in each of which a percentage of the number of the second hard phase grains with respect to a total number of the second hard phase grains in a total of 48 unit regions R is less than 0.5% or is more than 5% is 14 or less among the total of 48 unit regions R, and the total of 48 unit regions R are provided by arranging six unit regions R in a longitudinal direction and eight unit regions R in a lateral direction in an electron microscope image of the cemented carbide at an observation magnification of 10000×, each of the unit regions R being in a form of a square having each side of 1.5 μm.

(7) Preferably, a content ratio of the first hard phase grains of the cemented carbide is 80 volume % or more and 99 volume % or less, a content ratio of the second hard phase grains of the cemented carbide is 0.2 volume % or more and 3.0 volume % or less, and a content ratio of the binder phase of the cemented carbide is 0.5 volume % or more and 19.8 volume % or less.

With this, the wear resistance of the cemented carbide is improved.

(8) Preferably, the cemented carbide consists of the hard phase, the binder phase, and an inevitable impurity, a content ratio of the first hard phase grains of the cemented carbide is 80 volume % or more and 99 volume % or less, and a content ratio of the second hard phase grains of the cemented carbide is 0.2 volume % or more and 3.0 volume % or less. With this, the wear resistance of the cemented carbide is improved.

(9) A cutting tool of the present disclosure is a cutting tool including the above-described cemented carbide. The cutting tool of the present disclosure can have an excellent wear resistance even in high-speed processing.

DETAILS OF EMBODIMENTS OF THE PRESENT DISCLOSURE

Specific examples of cemented carbide and cutting tool of the present disclosure will be described below with reference to figures. In the figures of the present disclosure, the same reference symbols represent the same or corresponding portions. Further, a relation of such a dimension as a length, a width, a thickness, or a depth is modified as appropriate for clarity and brevity of the figures and does not necessarily represent an actual dimensional relation.

In the present specification, the expression "A to B" represents a range of lower to upper limits (i.e., A or more and B or less). When no unit is indicated for A and a unit is indicated only for B, the unit of A is the same as the unit of B.

In the present specification, "D10" represents a "10% cumulative number grain size of grains", "D50" represents a "50% cumulative number grain size of grains", and "D90" represents a "90% cumulative number grain size of grains".

In the present specification, the "10% cumulative number grain size of grains" means a 10% cumulative grain size from the small size side in a number-based cumulative grain size distribution of crystal grains. In the present specification, the "50% cumulative number grain size of grains" means a 50% cumulative grain size from the small size side in the number-based cumulative grain size distribution of the crystal grains. In the present specification, the "90% cumulative number grain size of grains" means a 90% cumulative grain size from the small size side in the number-based cumulative grain size distribution of the crystal grains.

Moreover, when a compound or the like is expressed by a chemical formula in the present specification and an atomic ratio is not particularly limited, it is assumed that all the conventionally known atomic ratios are included. The atomic ratio should not be necessarily limited only to one in the stoichiometric range. For example, when "WC" is described, the atomic ratio of WC includes all the conventionally known atomic ratios.

In the present specification, when one or more numerical values are described as each of lower and upper limits of a numerical range, it is assumed that a combination of any one numerical value described as the lower limit and any one numerical value described as the upper limit is also disclosed. For example, when a1 or more, b1 or more, and c1 or more are each described as the lower limit and a2 or less, b2 or less, and c2 or less are each described as the upper limit, it is assumed that a1 or more and a2 or less, a1 or more and b2 or less, a1 or more and c2 or less, b1 or more and a2 or less, b1 or more and b2 or less, b1 or more and c2 or less, c1 or more and a2 or less, c1 or more and b2 or less, c1 or more and c2 or less are disclosed.

First Embodiment: Cemented Carbide

<Cemented Carbide>

A cemented carbide of one embodiment (hereinafter also referred to as "the present embodiment") of the present disclosure will be described with reference to FIG. 1. FIG. 1 is a diagram schematically showing a cross section of the cemented carbide of the present embodiment.

The cemented carbide of the present embodiment is a cemented carbide including a hard phase and a binder phase 3, wherein the hard phase has first hard phase grains 1 and second hard phase grains 2, each of first hard phase grains 1 is composed of tungsten carbide, a second hard phase grain include a core portion 21 and a rim portion 22 that covers at least a portion of the core portion, a composition of core portion 21 is represented by $M1_{x1}W_{1-x1}C_{1-y1}N_{y1}$, the M1 is at least one metal element selected from a group consisting of a group 4 element, a group 5 element in a periodic table, chromium and molybdenum, the x1 is 0.70 or more and 1.00 or less, the y1 is 0 or more and 0.90 or less, a composition of rim portion 22 is represented by $M2_{x2}W_{1-x2}C_{1-y2}N_{y2}$, the M2 is at least one metal element selected from a group consisting of a group 4 element, a group 5 element in the periodic table, chromium and molybdenum, the x2 is 0.20 or more and less than 0.70, the y2 is 0 or more and 0.90 or less, binder phase 3 includes at least one iron group element selected from a group consisting of iron, cobalt and nickel, and a 50% cumulative number grain size of second hard phase grains 2 is 0.01 μm or more and 1.0 μm or less.

The cemented carbide of the present disclosure can have an excellent wear resistance even in high-speed processing when used as a tool material.

<Hard Phase>

In the cemented carbide of the present embodiment, the hard phase has the first hard phase grains and the second hard phase grains. The hard phase preferably consists of the first hard phase grains and the second hard phase grains. The hard phase preferably consists of the first hard phase grains, the second hard phase grains, and an inevitable impurity.

<First Hard Phase Grain>

(Composition of First Hard Phase Grain)

Each of the first hard phase grains is composed of tungsten carbide (WC). Here, the expression "each of the first hard phase grains is composed of tungsten carbide" means that each of the first hard phase grains substantially consists of tungsten carbide. Specifically, each of the first hard phase grains preferably includes 99.9 mass % or more of tungsten carbide.

Each of the first hard phase grains can include not only tungsten carbide but also an inevitable impurity element, a small amount of impurity element, and the like, which are introduced in a process of producing the WC, as long as the effect of the present disclosure is exhibited. Examples of these impurity elements include molybdenum (Mo) and chromium (Cr). The content ratio of the impurity element in the first hard phase grain (the total content ratio when the two or more impurity elements are included) is preferably less than 0.1 mass %. The content ratio of the impurity element in the first hard phase grain is measured by ICP (Inductively Coupled Plasma) emission spectrometry (measurement device: "ICPS-8100" (trademark) provided by Shimadzu Corporation).

(D50 of First Hard Phase Grains)

The 50% cumulative number grain size (D50) of the first hard phase grains is preferably 0.1 μm or more and 1.5 μm or less. With this, the wear resistance of the cemented carbide is improved.

The lower limit of the D50 of the first hard phase grains is preferably 0.1 μm or more, and is more preferably 0.2 μm or more. The upper limit of D50 of the first hard phase grains is preferably 1.5 μm or less, is more preferably 1.2 μm or less, and is further preferably 1.0 μm or less in order to improve breakage resistance and fracture resistance. The D50 of the first hard phase grains is preferably 0.1 μm or more and 1.5 μm or less, is more preferably 0.2 μm or more and 1.2 μm or less, and is further preferably 0.2 μm or more and 1.0 μm or less.

A method of measuring the grain size of each of the first hard phase grains to calculate the D50 of the first hard phase grains is as follows. First, the cemented carbide is subjected to CP (Cross Section Polisher) processing using an argon ion beam to obtain a sample having a smooth cross section. An electron microscope image (SEM-BSE image) of the cross section is obtained by capturing an image of the cross section at a magnification of 10000× using a field emission scanning electron microscope (FE-SEM) (measurement device: "JSM-7000F" (trademark) provided by JEOL).

The electron microscope image (SEM-BSE image) is subjected to EDX mapping using an energy dispersive X-ray spectrometer (EDX) accompanied with the field emission scanning electron microscope (FE-SEM), thereby specifying the first hard phase grains, the second hard phase grains, and the binder phase. In the EDX mapping image, a region in which tungsten exists corresponds to the first hard phase grain. In the EDX mapping image, a region in which at least one metal element selected from a group consisting of a group 4 element, a group 5 element in the periodic table, chromium and molybdenum exists corresponds to the second hard phase grain. In the present specification, the group 4 element in the periodic table includes titanium (Ti), zirconium (Zr), and hafnium (Hf), and the group 5 element in the periodic table includes vanadium (V), niobium (Nb), and tantalum (Ta). In the EDX mapping image, a region including at least one iron group element selected from a group consisting of iron, cobalt, and nickel corresponds to the binder phase.

The electron microscope image is introduced into a computer, and is subjected to image processing using image analysis software ("Mac-View" (trademark) provided by MOUNTECH), thereby calculating each of respective equivalent circle diameters (Heywood diameters: equivalent area equivalent circle diameters) of all the first hard phase grains observed in the electron microscope image (SEM-BSE image). The equivalent circle diameters correspond to the grain sizes of the first hard phase grains. Conditions for the image processing are as follows.

(Conditions for Image Processing)

Grain shape: non-spherical

Detection sensitivity: 5

Detection angle: 0.7

Scanning density: 7×1 times

High cut: Disabled

Low cut: Inverted

In the calculation of the D50 of the first hard phase grains, arbitrary ten electron microscope images (ten visual fields) are prepared so as to avoid appearance of overlapping image-captured portions in one cross section of the cemented carbide. The average of the D50s of the first hard phase grains in the ten visual fields is defined as the D50 of the first hard phase grains in the cemented carbide.

It should be noted that in the measurements performed by the applicant, it was confirmed that there was no variation in results even though the measurement visual fields were arbitrarily set.

Each of the D10, D50, and D90 of the second hard phase grains as described later can also be calculated in the same manner as described above by measuring the second hard phase grains in the electron microscope image.

(Content Ratio of First Hard Phase Grains)

The content ratio of the first hard phase grains in the cemented carbide of the present embodiment is preferably 80 volume % or more and 99 volume % or less. When the content ratio of the first hard phase grains in the cemented carbide is 80 volume % or more, the mechanical strength of the cemented carbide is improved. Here, the "mechanical strength" means mechanical strength including various properties such as wear resistance, breakage resistance, fracture resistance and bending strength of the cemented carbide. When the content ratio of the first hard phase grains in the cemented carbide is 99 volume % or less, the toughness of the cemented carbide is improved. The lower limit of the content ratio of the first hard phase grains in the cemented carbide is preferably 80 volume % or more, 83 volume % or more, 85 volume % or more, or 88 volume % or more. The upper limit of the content ratio of the first hard phase grains of the cemented carbide is preferably 99 volume % or less, 97 volume % or less, or 95 volume % or less. The content ratio of the first hard phase grains of the cemented carbide is preferably 80 volume % or more and 99 volume % or less, 83 volume % or more and 97 volume % or less, 85 volume % or more and 95 volume % or less, or 88 volume % or more and 95 volume % or less.

A method of measuring the content ratio (volume %) of the first hard phase grains in the cemented carbide is as follows. By performing EDX mapping on an electron microscope image (SEM-BSE image) of a cross section of a sample composed of the cemented carbide in the same manner as in the method of measuring the grain sizes of the first hard phase grains, the first hard phase grains, the second hard phase grains, and the binder phase are specified.

The electron microscope image is introduced into a computer, and is subjected to image processing using image analysis software ("Mac-View" (trademark) provided by MOUNTECH), thereby measuring the area ratio of the first hard phase grains specified by the EDX mapping with the entire visual field (9 μm in length×12 μm in width) being used as a denominator. Conditions for the image processing are the same as those in the method of measuring the grain sizes of the first hard phase grains. By assuming that the areas of the first hard phase grains are continuous in the depth direction of the cross section, the area ratio can be regarded as the content ratio (volume %) of the first hard phase grains in the measurement visual field.

In the method of measuring the content ratio of the first hard phase grains, five electron microscope images (five visual fields) are prepared so as to avoid appearance of overlapping image-captured portions in one cross section of the cemented carbide. The five visual fields are constituted of: one visual field at the center portion of the one cross section; and four visual fields located on the upper side, lower side, left side and right side with respect to the one visual field. The average of the content ratios of the first hard phase grains in the five visual fields is defined as the content ratio (volume %) of the first hard phase grains in the cemented carbide.

It should be noted that in the measurements performed by the applicant, it was confirmed that there was no variation in results even though the measurement visual fields were arbitrarily set.

The content ratio (volume %) of the second hard phase grains and the content ratio (volume %) of the binder phase in the cemented carbide as described later can also be measured in the same manner as described above by measuring the second hard phase grains and the binder phase in the measurement field.

<Second Hard Phase Grain>

(Form of Second Hard Phase Grain)

A second hard phase grain includes a core portion and a rim portion that covers at least a portion of the core portion. That is, the second hard phase grain has a double structure including the core portion and the rim portion that covers at least a portion of the core portion. The composition of the core portion is represented by $M1_{x1}W_{1-x1}C_{1-y1}N_{y1}$. Here, M1 is at least one metal element selected from a group consisting of a group 4 element, a group 5 element in the periodic table, chromium and molybdenum, x1 is 0.70 or more and 1.00 or less, and y1 is 0 or more and 0.90 or less. The composition of the rim portion is represented by $M2_{x2}W_{1-x2}C_{1-y2}N_{y2}$. Here, M2 is at least one metal element selected from a group consisting of a group 4 element, a group 5 element in the periodic table, chromium and molybdenum, x2 is 0.20 or more and less than 0.70, and y2 is 0 or more and 0.90 or less. When the cemented carbide includes the second hard phase grain and x1, y1, x2, and y2 are in the above ranges, excellent hardness of the second hard phase grain can be exhibited, with the result that the cemented carbide can have an excellent wear resistance.

(Core Portion)

The composition of the core portion is represented by $M1_{x1}W_{1-x1}C_{1-y1}N_{y1}$. Here, M1 is at least one metal element selected from a group consisting of a group 4 element (titanium (Ti), zirconium (Zr), hafnium (Hf)), a group 5 element (vanadium (V), niobium (Nb), tantalum (Ta)) in the periodic table, chromium (Cr), and molybdenum (Mo), x1 is 0.70 or more and 1.00 or less, and y1 is 0 or more and 0.90 or less.

M1 is preferably at least one metal element selected from a group consisting of Ti, Zr, Hf, Nb, Ta and Mo. M1 is more preferably at least one metal element selected from a group consisting of Ti, Zr and Nb.

x1 is preferably 0.80 or more and 1.00 or less. With this, the wear resistance of the cemented carbide is further improved. x1 is more preferably 0.83 or more and 1.00 or less and is further preferably 0.90 or more and 1.00 or less.

In order to attain fine second hard phase grains, y1 is 0 or more and 0.90 or less, is preferably 0.20 or more and 0.80 or less, and is more preferably 0.30 or more and 0.70 or less.

The composition of the core portion is not particularly limited, and examples thereof include TiWC, TiWCN, ZrWC, ZrWCN, NbWC, NbWCN, TiNbWC and TiNbWCN.

(Rim Portion)

The composition of the rim portion is represented by $M2_{x2}W_{1-x2}C_{1-y2}N_{y2}$. Here, M2 is at least one metal element selected from a group consisting of a group 4 element (titanium (Ti), zirconium (Zr), hafnium (Hf)), a group 5 element (vanadium (V), niobium (Nb), tantalum (Ta)) in the periodic table, chromium (Cr), and molybdenum (Mo), x2 is 0.20 or more and less than 0.70, and y2 is 0 or more and 0.90 or less.

M2 is preferably at least one metal element selected from a group consisting of Ti, Zr, Hf, Nb, Ta and Mo. M2 is more preferably at least one metal element selected from a group consisting of Ti, Zr and Nb.

x2 is preferably 0.40 or more and less than 0.70. With this, the wear resistance of the cemented carbide is further improved. x2 is more preferably 0.50 or more and less than 0.70, and is further preferably 0.60 or more and less than 0.70.

In order to attain fine second hard phase grains, y2 is 0 or more and 0.90 or less, is preferably 0.20 or more and 0.80 or less, and is more preferably 0.30 or more and 0.70 or less.

The composition of the rim portion is not particularly limited, and examples thereof include WTiC, WTiCN, WZrC, WZrCN, WNbC, WNbCN, WTiNbC and WTiNbCN.

Methods of measuring the form of the second hard phase grain and the compositions and atomic ratios of the core portion and the rim portion will be described in (A1) to (H1) as follows.

(A1) The first hard phase grains, the second hard phase grains, and the binder phase are specified by performing EDX mapping on an electron microscope image (SEM-BSE image) of a cross section of a sample composed of the cemented carbide in the same manner as in the method of measuring the grain sizes of the first hard phase grains.

(B1) Each of the second hard phase grains specified above are subjected to a line analysis using an energy dispersive X-ray spectrometer (EDX) accompanied with an field emission scanning electron microscope (FE-SEM). The line analysis will be specifically described with reference to FIG. 2.

Figure 2:
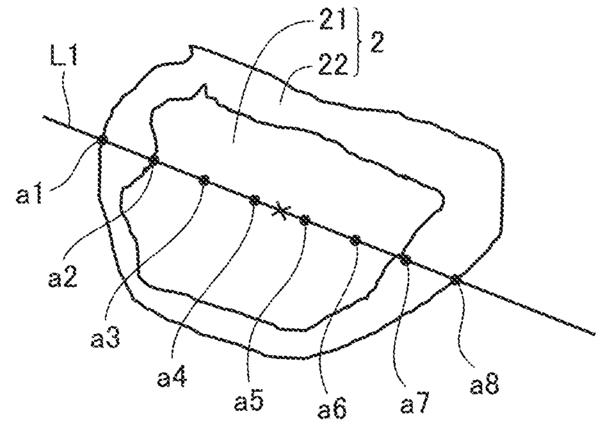
FIG. 2 is a diagram showing a method of performing a line analysis on a second hard phase grain.

(C1) FIG. 2 is a diagram showing a method of performing the line analysis on the second hard phase grain. In FIG. 2, X represents the center of gravity of the second hard phase grain, and each of a1 to a8 represents a measurement point. First, the electron microscope image is introduced into a computer, and is subjected to image processing using image analysis software ("Mac-View" (trademark) provided by MOUNTECH), thereby specifying center of gravity X of any one of the second hard phase grains. Conditions for the image processing are the same as those in the method of measuring the grain sizes of the first hard phase grains. Here, center of gravity X is specified based on the shape of the second hard phase grain in the electron microscope image. An arbitrary line L1 passing through center of gravity X is drawn. Intersections (measurement points) a1 and a8 between the outer edge of the second hard phase grain and line L1 are specified. A line segment connecting a1 and a8 to each other is equally divided into seven, thereby specifying positions (measurement points) a2 to a7.

(D1) An EDX analysis is performed at each of measurement points a1 to a8 to calculate the composition of the second hard phase grain and a ratio (atomic %) of each element at each of the measurement points.

(E1) When a difference $M_{max}$-$M_{min}$ is more than 40 atomic % at each of eight measurement points a1 to a8 between maximum value $M_{max}$ (atomic %) and minimum value $M_{min}$ (atomic %) of the ratio of at least one metal element (corresponding to M1 in $M1_{x1}W_{1-x1}C_{1-y1}N_{y1}$ and M2 in $M2_{x2}W_{1-x2}C_{1-y2}N_{y2}$) selected from a group consisting of a group 4 element, a group 5 element in the periodic table, chromium and molybdenum, it is determined that the form of the second hard phase grain is the double structure.

(F1) The determination in (E1) above is performed for any ten second hard phase grains. In the present specification, when five or more of the ten second hard phase grains are determined to each have the double structure, it is determined that "in the cemented carbide, the form of the second hard phase grain is the double structure", i.e., "in the cemented carbide, a second hard phase grain includes a core portion and a rim portion that covers at least a portion of the core portion". In the present specification, the expression "in the cemented carbide, a second hard phase grain includes a core portion and a rim portion that covers at least a portion of a core portion" means "the percentage of the number of second hard phase grains each having the double structure with respect to the total number of the second hard phase grains in the cemented carbide is 50% or more".

(G1) The average value of the ratios of each element at the measurement points at each of which the ratio of the metal element is 70 atomic % or more among the eight measurement points obtained in (D1) above is defined as the ratio of the element in the core portion. Further, the average value of the ratios of each element at the measurement points at each of which the ratio of the metal element is less than 70 atomic % among the eight measurement points is defined as the ratio of the element in the rim portion. Thus, the composition and ratio of each element of each of the core portion and the rim portion in the second hard phase grain are specified.

(H1) Specifying the composition and ratio of each element of each of the core portion and the rim portion in (G1) is performed for any ten second hard phase grains. In the present specification, the average value of the ratios of each element of the core portions and the rim portions of the ten second hard phase grains is defined as the ratio of each element of each of the core portion and the rim portion of each of the second hard phase grains in the cemented carbide. Thus, the composition and ratio of each element of each of the core portion and the rim portion of the second hard phase grain in the cemented carbide are specified.

It should be noted that in the measurements performed by the applicant, it was confirmed that there was no variation in results even though the measurement visual fields were arbitrarily set.

The composition of tungsten carbide in the first hard phase grain and the composition of the binder phase described later can also be measured in the same manner as described above by measuring the first hard phase grains and the binder phase in the electron microscope image.

(D50 of Second Hard Phase Grains)

The 50% cumulative number grain size (D50) of the second hard phase grains is 0.01 μm or more and 1.0 μm or less. With this, the wear resistance of the cemented carbide is improved.

The lower limit of the D50 of the second hard phase grains is 0.01 μm or more, and can be 0.1 μm or more and 0.15 μm or more. The D50 of the second hard phase grains is 1.0 μm or less, is preferably 0.5 μm or less, is more preferably 0.4 μm or less, and is further preferably 0.3 μm or less in order to improve the breakage resistance and the fracture resistance. The D50 of the second hard phase grains is preferably 0.1 μm or more and 1.0 μm or less, is preferably 0.1 μm or more and 0.5 μm or less, is more preferably 0.15 μm or more and 0.4 μm or less, and is further preferably 0.15 μm or more and 0.3 μm or less.

(D10/D90 of Second Hard Phase Grains)

A ratio D10/D90 of the 10% cumulative number grain size (D10) and the 90% cumulative number grain size (D90) of the second hard phase grains is preferably 0.1 or more and 0.5 or less. With this, the grain size distribution of the second hard phase grains is sharp, the second hard phase grains are not aggregated, and the structure of the cemented carbide becomes homogeneous, thereby improving the breakage resistance and the fracture resistance. Ratio D10/D90 of the second hard phase grains is more preferably 0.1 or more and 0.4 or less.

Each of the D10, D50, and D90 of the second hard phase grains can be calculated in the same manner as in the method of measuring the D50 of the first hard phase grains by measuring the second hard phase grains in the electron microscope image in the method of measuring the D50 of the first hard phase grains.

(Dispersion State of Second Hard Phase Grains)

In the cemented carbide of the present embodiment, the second hard phase grains preferably exist dispersedly. In the present specification, the expression "in the cemented carbide, the second hard phase grains exist dispersedly" means that the second hard phase grains are uniformly dispersed in the cemented carbide, rather than existing unevenly. The expression "in the cemented carbide, the second hard phase grains exist unevenly" means that the second hard phase grains exist in the cemented carbide in an unbalanced manner. A method of determining whether the second hard phase grains exist dispersedly or exist unevenly in the cemented carbide will be described below. The determination method will be described in (A2) to (D2) as follows.

(A2) The first hard phase grains, the second hard phase grains, and the binder phase are specified by performing EDX mapping on an electron microscope image (SEM-BSE image) of a cross section of a sample composed of the cemented carbide in the same manner as in the method of measuring the grain sizes of the first hard phase grains.

Figures 3, 4:
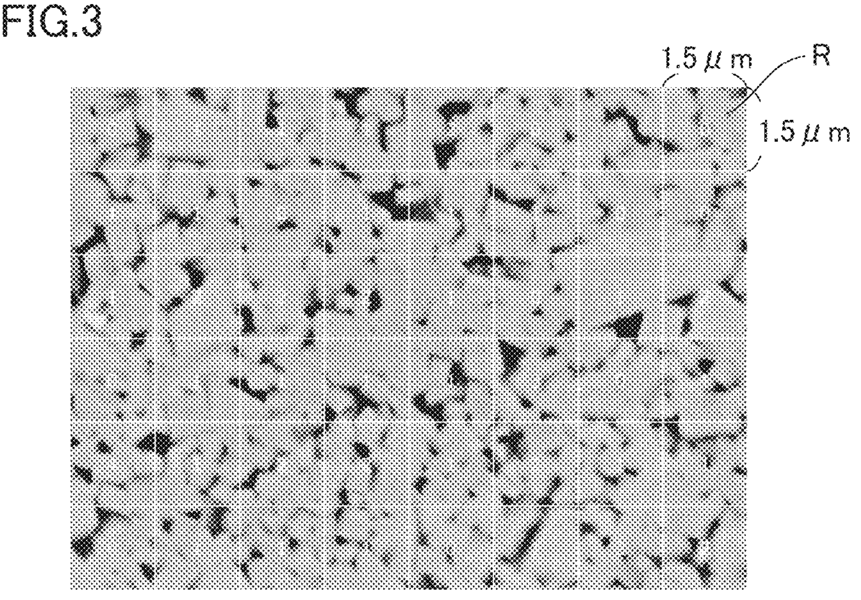
FIG. 3 is a diagram showing that unit regions R are provided in an electron microscope image of the cross section of the cemented carbide of the embodiment of the present disclosure.
FIG. 4 is a diagram showing a percentage of the number of second hard phase grains in each unit region R with respect to the total number of the second hard phase grains in a total of 48 unit regions R in the electron microscope image of FIG. 3.

(B2) Next, as shown in FIG. 3, in the electron microscope image (9 μm×12 μm), a total of 48 unit regions R are provided by arranging six unit regions R in the longitudinal direction and eight unit regions R in the lateral direction, each of unit regions R being in the form of a square having each side of 1.5 μm.

(C2) The number of the second hard phase grains specified by the EDX mapping in each unit region R is counted by performing an image analysis using image analysis software ("Mac-View" (trademark) provided by MOUNTECH). Conditions for the image processing are the same as those in the method of measuring the grain sizes of the first hard phase grains. When a second hard phase grain exists to extend across two or more adjacent unit regions R, the second hard phase grain is counted as being assumed to be included in a unit region R having the smallest number of second hard phase grains among unit regions R across which the second hard phase grain exists to extend. When a second hard phase grain is considered to be formed by two second hard phase grains being joined to each other in view of the shape of the second hard phase grain, the second hard phase grain is counted as one second hard phase grain.

In FIG. 3, the first hard phase grains are shown in white, the second hard phase grains are shown in black, and the binder phase is shown in gray.

(D2) Then, the total number of the second hard phase grains in the total of 48 unit regions R is counted, and the percentage of the number of the second hard phase grains in each unit region R with respect to the total number is calculated as shown in FIG. 4.

Since the total of 48 unit regions R are provided in the electron microscope image, the percentage of the number of the second hard phase grains in each unit region R is 2.08%(1/48×100%) when the second hard phase grains do not exist unevenly and are uniformly dispersed in the cemented carbide. In the present specification, when the number of unit regions R in each of which the percentage of the number of the second hard phase grains is less than 0.5% or is more than 5% is 14 or less among the total of 48 unit regions R, it is determined that the second hard phase grains exist dispersedly in the cemented carbide. On the other hand, when the number of unit regions R in each of which the percentage of the number of the second hard phase grains is less than 0.5% or is more than 5% is 15 or more among the total of 48 unit regions R, it is determined that the second hard phase grains exist unevenly in the cemented carbide.

In FIG. 4, the number of unit regions R in each of which the percentage of the number of the second hard phase grains is less than 0.5% or is more than 5% is 12 among the total of 48 unit regions R. Therefore, in the cemented carbide shown in FIG. 4, it is determined that the second hard phase grains are dispersed.

It should be noted that in the measurements performed by the applicant, it was confirmed that there was no variation in results even though the measurement visual fields were arbitrarily set.

In the cemented carbide of the present embodiment, the number of unit regions R in each of which the percentage of the number of the second hard phase grains is less than 0.5% or is more than 5% is preferably 14 or less among the total of 48 unit regions R. That is, the second hard phase grains exist dispersedly in the cemented carbide. With this, the wear resistance of the cemented carbide is improved.

The number of unit regions R in each of which the percentage of the number of the second hard phase grains is less than 0.5% or is more than 5% is preferably 13 or less, is more preferably 12 or less, and is further preferably 10 or less among the total of 48 unit regions R.

(Content Ratio of Second Hard Phase Grains)

The content ratio of the second hard phase grains in the cemented carbide of the present embodiment is preferably 0.2 volume % or more and 3.0 volume % or less. When the content ratio of the second hard phase grains of the cemented carbide is 0.2 volume % or more, the wear resistance is improved. When the content ratio of the second hard phase grains of the cemented carbide is 3.0 volume % or less, the strength is improved. The lower limit of the content ratio of the second hard phase grains of the cemented carbide is preferably 0.2 volume % or more, 0.5 volume % or more, 0.6 volume % or more, 0.8 volume % or more, 1.0 volume % or more, or 1.3 volume % or more. The upper limit of the content ratio of the second hard phase grains of the cemented carbide is preferably 3.0 volume % or less, 2.5 volume % or less, 2.1 volume % or less, or 2.0 volume % or less. The content ratio of the second hard phase grains of the cemented carbide is 0.2 volume % or more and 3.0 volume % or less, 0.5 volume % or more and 2.5 volume % or less, 0.6 volume % or more and 2.1 volume % or less, 0.8 volume % or more and 2.1 volume % or less, 1.0 volume % or more and 2.1 volume % or less, 1.3 volume % or more and 2.1 volume % or less, 0.2 volume % or more and 2.0 volume % or less, 0.5 volume % or more and 2.0 volume % or less, 0.6 volume % or more and 2.0 volume % or less, 0.8 volume % or more and 2.0 volume % or less, 1.0 volume % or more and 2.0 volume % or less, or 1.3 volume % or more and 2.0 volume % or less.

The content ratio (volume %) of the second hard phase grains in the cemented carbide can be calculated in the same manner as in the method of measuring the content ratio (volume %) of the first hard phase grains by measuring the second hard phase grains in the electron microscope image in the method of measuring the content ratio (volume %) of the first hard phase grains.

<Binder Phase>

(Composition of Binder Phase)

The binder phase includes at least one iron group element selected from a group consisting of iron, cobalt and nickel. The content ratio of the iron group element in the binder phase is preferably 90 mass % or more, is more preferably 95 mass % or more, is further preferably 98 mass % or more, and is most preferably 100 mass %.

In addition to the iron group element, the binder phase can include an inevitable impurity element introduced from the first hard phase grains and the second hard phase grains, a small amount of impurity element, and the like, as long as the effect of the present disclosure is exhibited. Examples of these impurity elements include tungsten (W) and titanium (Ti). The content ratio of the impurity element in the binder phase (the total content ratio when the two or more impurity elements are included) is preferably less than 1 mass %. The content ratio of the impurity element in the binder phase is measured by ICP (Inductively Coupled Plasma) emission spectrometry (measurement device: "ICPS-8100" (trademark) provided by Shimadzu Corporation).

(Content Ratio of Binder Phase)

The content ratio of the binder phase in the cemented carbide of the present embodiment is preferably 0.5 volume % or more and 20 volume % or less. When the content ratio of the binder phase of the cemented carbide is 0.5 volume % or more, the adhesion strengths of the first hard phase grains, the second hard phase grains, and the binder phase are improved to result in improved toughness of the cemented carbide. When the content ratio of the binder phase of the cemented carbide is 20 volume % or less, the hardness of the cemented carbide is improved. The lower limit of the content ratio of the binder phase of the cemented carbide is preferably 0.5 volume % or more, 1 volume % or more, 5 volume % or more, or 9 volume % or more. The content ratio of the binder phase of the cemented carbide is preferably 20 volume % or less, 19.8 volume % or less, 19.5 volume % or less, 18 volume % or less, 15 volume % or less, or 12.1 volume % or less. The content ratio of the binder phase of the cemented carbide is preferably 0.5 volume % or more and 20 volume % or less, 1 volume % or more and 19.8 volume % or less, 5 volume % or more and 19.5 volume % or less, 9 volume % or more and 18 volume % or less, or 9 volume % or more and 15 volume % or less.

The content ratio (volume %) of the binder phase in the cemented carbide can be calculated in the same manner as in the method of measuring the content ratio (volume %) of the first hard phase grains by measuring the binder phase in the electron microscope image in the method of measuring the content ratio (volume %) of the first hard phase grains.

<Chromium and Vanadium>

The cemented carbide of the present embodiment preferably does not include one or both of chromium and vanadium. That is, the cemented carbide of the present embodiment preferably does not include chromium, the cemented carbide of the present embodiment preferably does not include vanadium, or the cemented carbide of the present embodiment preferably does not include chromium and vanadium. Each of chromium carbide ($Cr_3C_2$) and vanadium carbide (VC) has a grain growth suppressing effect, and therefore has been used as a grain growth suppressing agent when producing a conventional ultrafine-grained cemented carbide. However, when chromium is precipitated as carbide in the cemented carbide, the chromium tends to become a starting point of breakage. Further, since vanadium in the cemented carbide exists at an interface between the grains, the strength of the cemented carbide tends to be decreased. Therefore, when one or both of chromium and vanadium is not included in the cemented carbide, the breakage resistance and fracture resistance of the cemented carbide are improved. It should be noted that when the second hard phase grain includes one or both of chromium and vanadium, it is preferable that the binder phase of the regions other than the second hard phase grains of the cemented carbide does not include one or both of chromium and vanadium.

The content ratio of each of chromium and vanadium in the cemented carbide is measured by ICP (Inductively Coupled Plasma) emission spectrometry (measurement device: "ICPS-8100" (trademark) provided by Shimadzu Corporation). In the present specification, in the ICP spectrometry, when the content ratio of chromium is less than or equal to a detection limit, it is determined that "the cemented carbide does not include chromium", and when the content ratio of vanadium is less than or equal to the detection limit, it is determined that "the cemented carbide does not include vanadium".

<Composition of Cemented Carbide>

The cemented carbide of the present embodiment includes the hard phase and the binder phase. The cemented carbide preferably consists of the hard phase and the binder phase. The cemented carbide preferably consists of the hard phase, the binder phase, and an inevitable impurity. The cemented carbide preferably consists of the first hard phase grains, the second hard phase grains, and the binder phase. The cemented carbide preferably consists of the first hard phase grains, the second hard phase grains, the binder phase, and the inevitable impurity.

In the present embodiment, the content ratio of the first hard phase grains of the cemented carbide is preferably 80 volume % or more and 99 volume % or less, the content ratio of the second hard phase grains of the cemented carbide is preferably 0.2 volume % or more and 3.0 volume % or less, and the content ratio of the binder phase of the cemented carbide is preferably from 0.5 volume % or more and 19.8 volume % or less.

The cemented carbide of the present embodiment consists of the hard phase, the binder phase, and the inevitable impurity, and the content ratio of the first hard phase grains of the cemented carbide is preferably 80 volume % or more and 99 volume % or more, and the content ratio of the second hard phase grains of the cemented carbide is preferably 0.2 volume % or more and 3.0 volume % or less.

Second Embodiment: Cutting Tool

A cutting tool of the present embodiment includes the above-described cemented carbide. The cutting tool preferably includes a cutting edge composed of the above-described cemented carbide. In the present specification, the cutting edge means a portion involved in cutting, and means a region surrounded by its cutting edge ridgeline and an imaginary plane at a distance of 2 mm to a tangential line of the cutting edge ridgeline in a direction from the cutting edge ridgeline to the cemented carbide side in the cemented carbide.

Examples of the cutting tool include a cutting bite, a drill, an end mill, an indexable cutting insert for milling, an indexable cutting insert for turning, a metal saw, a gear cutting tool, a reamer, a tap, and the like. In particular, when the cutting tool of the present embodiment is a small-diameter drill for processing a printed circuit board, the cutting tool of the present embodiment can exhibit an excellent effect.

The cemented carbide of the present embodiment may constitute a whole or part of each of these tools. Here, the expression "constitutes a part" indicates a configuration or the like in which the cemented carbide of the present embodiment is brazed to a predetermined position of any substrate to serve as a cutting edge portion.

The cutting tool of the present embodiment can further include a hard film that covers at least a portion of a surface of a substrate composed of the cemented carbide. Examples of the hard film include diamond-like carbon and diamond.

Third Embodiment: Method of Producing Cemented Carbide

The cemented carbide of the first embodiment can be produced representatively by performing a preparation step for source material powders, a mixing step, a molding step, a sintering step, and a cooling step in this order. Hereinafter, each step will be described.

<Preparation Step>

The preparation step is a step of preparing all source material powders of materials of the cemented carbide. As the source material powders, a tungsten carbide powder, a hydride (hereinafter also referred to as "metal hydride") powder of a metal element selected from a group consisting of a group 4 element, a group 5 element in the periodic table, chromium and molybdenum, a graphite powder, and an iron group element powder are prepared.

(Tungsten Carbide Powder)

The average particle size of the tungsten carbide powder is preferably 0.1 μm or more and 1.5 μm or less. When the average particle size of the tungsten carbide powder is fine to fall within the above range, the dispersibility of the second hard phase grains in the cemented carbide can be improved. In the present specification, the average particle size of each powder is measured using a particle size distribution analysis device (MT330EX (trademark)) provided by Microtrac.

(Metal Hydride Powder)

Examples of the metal hydride powder include titanium hydride ($TiH_2$), zirconium hydride ($ZrH_2$), and niobium hydride (NbH). The metal element in the metal hydride powder serves as a supply source for each of metal elements M1 and M2 in the second hard phase grain.

The average particle size of the metal hydride powder is preferably 0.1 μm or more and 1.0 μm or less. With this, an aggregate of the second hard phase grains is less likely to be formed in the cemented carbide.

(Graphite Powder)

As the graphite powder, a conventionally known graphite powder can be used. Particularly, artificial graphite is preferably used. Carbon in the graphite powder serves as a carbon source for the second hard phase grain.

The average particle size of the graphite powder is preferably 10 nm or more and 100 nm or less. With this, an aggregate of the graphite powder is less likely to be formed in the cemented carbide.

Examples of the iron group element powder include an iron powder, a cobalt powder, and a nickel powder. The iron group element powder is a source material for the binder phase.

The average particle size of the iron group element powder is preferably 0.1 μm or more and 1.5 μm or less. With this, an aggregate of the binder phase is less likely to be formed in the cemented carbide.

<Mixing Step>

The mixing step is a step of mixing the source material powders prepared in the preparation step so as to obtain a powder mixture.

The ratio of the tungsten carbide powder in the powder mixture is preferably, for example, 88 mass % or more and 99 mass % or less.

The ratio of the metal hydride powder in the powder mixture is preferably, for example, 0.1 mass % or more and 1.0 mass % or less.

The ratio of the graphite powder in the powder mixture is preferably, for example, 0.05 mass % or more and 0.3 mass % or less. In the present embodiment, not only the graphite powder but also carbon in CO gas in the sintering step described later are each used as a carbon source for the second hard phase grain. Therefore, the ratio of the graphite powder in the powder mixture can be small as described above. Thus, the sintered material structure can be suppressed from being inhomogeneous or being decreased in strength due to residual carbon having not been incorporated into the second hard phase grains.

The ratio of the iron group element powder in the powder mixture is preferably, for example, 0.3 mass % or more and 15 mass % or less.

The mixing is preferably performed using a bead mill for 0.5 hour or more and 24 hours or less. With this, excessive pulverization can be suppressed, thereby suppressing the particle size distribution of the powder mixture from being broad.

After the mixing step, the powder mixture may be granulated as required. By granulating the powder mixture, the powder mixture can be readily introduced into a die or mold in the molding step described later. A known method can be used for the granulation. For example, a commercially available granulator such as a spray dryer or an extrusion granulator can be used.

<Molding Step>

The molding step is a step of molding the powder mixture obtained in the mixing step into a predetermined shape so as to obtain a molded material. As a molding method and molding conditions in the molding step, general method and conditions can be used. Examples of the predetermined shape include a cutting tool shape (for example, a round bar for a small drill).

<Sintering Step>

The sintering step is a step of sintering the molded material obtained in the molding step so as to obtain the cemented carbide. First, the molded material is heated at a temperature of 1350 to 1500° C. for 60 to 120 minutes in a mixed gas including a nitrogen ($N_2$) gas and a carbon monoxide (CO) gas. Regarding the volume ratio of $N_2$ and CO in the mixed gas, $N_2$ is preferably more than 50 volume % and 80 volume % or less and CO is 20 volume % or more and less than 50 volume % when the total of $N_2$ and CO is regarded as 100 volume %. Carbon in the CO gas used herein serves as a carbon source for the second hard phase grain.

Then, the molded material having been heated is heated at a temperature of 1350 to 1500° C. and is fed with a pressure of more than 10 kPa and 30 kPa or less for 60 to 120 minutes in a nitrogen ($N_2$) gas, thereby obtaining the cemented carbide. By feeding the pressure, coarse defects can be suppressed from being formed in the cemented carbide. By heating and feeding the pressure in the $N_2$ gas, an amount of nitrogen in the second hard phase grain is increased, thereby improving a degree of dispersion of the second hard phase grains in the cemented carbide.

In the sintering step, the metal hydride powder, the tungsten carbide powder, the graphite powder, and the $N_2$ gas are temporarily dissolved in the binder phase composed of the iron group element, and these constituent elements form a composite material, and the composite material is precipitated by the subsequent cooling step. The composite material is considered to be the second hard phase grain. In the sintering step, the composite material and WC particles therearound are dissolved with each other in a solid state, melted and precipitated again, thereby forming the rim portion. Therefore, the composition of the rim portion is such a composition that an amount of each of W and C is larger than that in the core portion at the center portion. When the metal hydride powder is used, the composite material is less likely to be coarse and aggregated in the sintering step. Therefore, the dispersibility of the second hard phase grains in the cemented carbide can be improved. This was newly found as a result of diligent study by the present inventors.

<Cooling Step>

The cooling step is a step of cooling the cemented carbide after completion of the sintering. Cooling conditions are not particularly limited, and general conditions can be used.

<Additional Note>

The above description includes an embodiment additionally described below.

[Additional Note 1]

In the cemented carbide of the present disclosure, the number of unit regions R in each of which the percentage of the number of the second hard phase grains with respect to the total number of the second hard phase grains in the total of 48 unit regions R is less than 0.5% or is more than 5% is preferably 13 or less among the total of 48 unit regions R.

In the cemented carbide of the present disclosure, the number of unit regions R in each of which the percentage of the number of the second hard phase grains with respect to the total number of the second hard phase grains in the total of 48 unit regions R is less than 0.5% or is more than 5% is preferably 12 or less among the total of 48 unit regions R.

In the cemented carbide of the present disclosure, the number of unit regions R in each of which the percentage of the number of the second hard phase grains with respect to the total number of the second hard phase grains in the total of 48 unit regions R is less than 0.5% or is more than 5% is preferably 10 or less among the total of 48 unit regions R.

EXAMPLES

The present embodiment will be described more specifically with reference to examples. However, the present embodiment is not limited by these examples.

[Samples a to e and Samples A to H]

<Production of Cemented Carbide>

(Preparation Step)

A tungsten carbide powder, a metal hydride powder, an artificial graphite powder, a chromium carbide ($Cr_3C_2$) powder, a vanadium carbide (VC) powder, and a cobalt (Co) powder were prepared as source material powders. The average particle size of the tungsten carbide (WC) powder is 1.0 μm. The average particle size of the metal hydride ($TiH_2$) powder is 1.0 μm. The average particle size of the artificial graphite powder ("UF-G5 (trademark)" provided by Showa Denko) is 3 μm. The average particle size of the chromium carbide ($Cr_3C_2$) powder is 0.8 μm. The average particle size of the vanadium carbide (VC) powder is 0.8 μm. The average particle size of the cobalt (Co) powder is 0.8 μm. Each of the WC powder, the metal hydride powder, the chromium carbide powder, the vanadium carbide powder, and the cobalt powder is commercially available.

(Mixing Step)

The source material powders were mixed to obtain a powder mixture. The ratio of each source material powder in the powder mixture was as follows.

Metal hydride ($TiH_2$) powder: 0.2 to 2.0 mass %

Artificial graphite powder: 0.1 to 2.5 mass %

Cobalt (Co) powder: 0.5 to 15 mass %

Chromium carbide ($Cr_3C_2$) powder: 0.3 mass % (blended only in sample G)

Vanadium carbide (VC) powder: 0.1 mass % (blended only in sample H)

Tungsten carbide powder: remainder (adjustment is made such that the remainder of the powder mixture is constituted of the tungsten carbide powder.)

The mixing was performed using a bead mill for 12 hours. The obtained powder mixture was granulated using a spray dryer.

(Molding Step)

The obtained granules were press-molded to produce a molded material having a round bar shape with φ3.4 mm.

(Sintering Step)

The molded material was heated at a temperature of 1500° C. and was fed with a pressure of 2 to 50 kPa for 60 minutes in a mixed gas obtained by mixing a $N_2$ gas and a CO gas with $N_2$/CO (volume ratio) being more than 1 and 4 or less. Then, the molded material was heated at a temperature of 1500° C. and was fed with a pressure of 2 to 50 kPa in a nitrogen gas for 60 minutes, thereby obtaining a cemented carbide.

(Cooling Step)

The cemented carbide was gradually cooled in an argon (Ar) gas atmosphere.

[Sample I]

For a sample I, a cemented carbide was produced by a method described in PTL 1. Specifically, sample I was produced in the following procedure.

(Preparation Step)

As source material powders, a WC powder (average particle size: 2.6 μm), a TiC powder (average particle size: 0.7 μm), a TaC powder (average particle size: 0.6 μm), a $Cr_3C_2$ powder (average particle size: 0.9 μm), and a Co powder (average particle size: 0.4 μm) were prepared.

(Mixing Step)

The source material powders were mixed to obtain a powder mixture. The mixing was performed together with a solvent using an attritor (rotation speed: 250 rpm) for 1 hour. The obtained powder mixture was granulated using a spray dryer.

(Molding Step)

The obtained granules were press-molded to produce a molded material having a round bar shape.

(Sintering Step)

The molded material was heated in an Ar gas at a temperature of 1330° C. for 2 hours, thereby obtaining a cemented carbide having a round bar shape.

(Cooling Step)

The cemented carbide was gradually cooled in an argon (Ar) gas atmosphere.

[Sample J]

For a sample J, a cemented carbide having a round bar shape was produced in the same manner as in each of samples a to d except that a $TiO_2$ powder was used instead of the metal hydride ($TiH_2$) powder and an argon gas was used during sintering.

<Evaluations>

(D50 of First Hard Phase Grains and D50 of Second Hard Phase Grains)

For each sample, the 50% cumulative number grain sizes (D50) of the first hard phase grains and the second hard phase grains were measured. The specific measurement method has been described in the first embodiment, and therefore will not be described repeatedly. Results are shown in the column "D50 (μm)" of "First Hard Phase Grains" and the column "D50 (μm)" of "Second Hard Phase Grains" of "Cemented Carbide" in Table 1. It should be noted that no measurement was performed in the case of a sample with "–" described in the column "D50 (μm)".

(D10/D90 of Second Hard Phase Grains)

For each sample, D10/D90 of the second hard phase grains was measured. The specific measurement method has been described in the first embodiment, and therefore will not be described repeatedly. Results are shown in the column "D10/D90" of "Second Hard Phase Grains" of "Cemented Carbide" in Table 2.

(Form of Second Hard Phase Grain, and Compositions and Atomic Ratios of Core Portion and Rim Portion)

For each sample, the form of the second hard phase grains and the compositions and atomic ratios of the core portion and the rim portion were measured. The specific measurement method has been described in the first embodiment, and therefore will not be described repeatedly. In each of samples a to d, samples A to H, and sample J, the form of the second hard phase grain was the double structure. It was presumed that the form of the second hard phase grain of sample I was a uniform composition, rather than the double structure.

The compositions and atomic ratios of the core portion and the rim portion are shown in the columns "Core Portion Composition $Ti_{x1}W_{1-x1}C_{1-y1}N_{y1}$" and "Rim Portion Composition $Ti_{x2}W_{1-x2}C_{1-y2}N_{y2}$" of the "Second Hard Phase Grains" of "Cemented Carbide" in Table 1. For example, the composition of the core portion of sample a is $Ti_{0.83}W_{0.17}C_{0.52}N_{0.48}$, and the composition of the rim portion thereof is $Ti_{0.68}W_{0.32}C_{0.34}N_{0.66}$. The composition of the second hard phase grain of sample I was TiWC.

(Content Ratios of Chromium and Vanadium)

The mass-based content ratios of chromium and vanadium were measured in the cemented carbide of each sample. The specific measurement method has been described in the first embodiment, and therefore will not be described repeatedly.

It was confirmed that sample G includes chromium and sample H includes vanadium. It was confirmed that each of the other samples includes none of chromium and vanadium.

(Determination of Dispersion State of Second Hard Phase Grains)

For each sample, it was determined whether the second hard phase grains exists dispersedly or exists unevenly in the cemented carbide. The specific determination method has been described in the first embodiment, and therefore will not be described repeatedly. When the number of unit regions R in each of which the percentage of the number of the second hard phase grains is less than 0.5% or is more than 5% is 14 or less among the total of 48 unit regions R, it is determined that the second hard phase grains exist dispersedly in the cemented carbide. When the number of unit regions R is 15 or more, it is determined that the second hard phase grains exist unevenly in the cemented carbide. Results are shown in "Dispersed/Uneven (Number)" of "Second Hard Phase Grains" of "Cemented Carbide" in Table 1. In this column, each numerical value in parentheses indicates the number of unit regions R in which the percentage of the number of the second hard phase grains is less than 0.5% or is more than 5% among the total of 48 unit regions R.

(Composition of Cemented Carbide)

For each sample, the content ratio of the first hard phase grains, the content ratio of the second hard phase grains, and the content ratio of the binder phase in the cemented carbide were measured. The specific measurement method has been described in the first embodiment, and therefore will not be described repeatedly. Results are shown in the column "Volume %" of "First Hard Phase Grains", the column "Volume %" of "Second Hard Phase Grains", and the column "Volume %" of "Binder Phase" of "Cemented Carbide" in Table 1.

(Cutting Test)

The tip of the round bar composed of the cemented carbide of each sample was processed to have a cutting edge, thereby producing a small-diameter drill having a cutting edge diameter φ of 0.3 mm. Five drills were prepared for each sample. A commercially available on-vehicle printed wiring board was processed to form holes therein using each of the drills. Conditions for the processing to form holes were as follows: a rotation speed of 160 krpm; and a feeding speed of 2.4 m/min. These conditions correspond to high-speed processing. A wear amount of the drill was measured in the drill after processing to form 10000 holes. The average of the wear amounts of the five drills is shown in the column "Wear Amount (μm)" of "Cutting Test" in Table 1. As the wear amount is smaller in value, the wear resistance is more excellent. Further, the cutting edge state upon the end of the cutting test is shown in the column "Cutting Edge State" of "Cutting Test" in Table 1. The term "Normal Wear" indicates a state in which the drill can be continuously used after the cutting test is ended. The "Great Wear" indicates a state in which due to occurrence of uneven wear and abnormal wear, it is difficult to continuously use the drill after the cutting test is ended.

TABLE 1

| | Cemented Carbide | | | | | | | | | | | | Cutting Test | |
|---|---|---|---|---|---|---|---|---|---|---|---|---|---|---|
| | First Hard Phase Grains | | Second Hard Phase Grains | | | | | | | | | Binder Phase | | |
| | | | | | | Core Portion Composition $Ti_{x1}W_{1-x1}C_{1-y1}N_{y1}$ | | Rim Portion Composition $Ti_{x2}W_{1-x2}C_{1-y2}N_{y2}$ | | | | | | |
| Sample | D50 (μm) | Volume % | D50 (μm) | D10/D90 | Volume % | x1 | y1 | x2 | y2 | Dispersed/Uneven (Number) | Volume % | Wear Amount (μm) | Cutting Edge State |
| a | 0.6 | 91.8 | 0.16 | 0.31 | 0.6 | 0.83 | 0.48 | 0.68 | 0.66 | Dispersed (10) | 7.6 | 15 | Normal Wear |
| b | 0.6 | 98.5 | 0.42 | 0.33 | 0.6 | 0.93 | 0.59 | 0.43 | 0.62 | Dispersed (9) | 0.9 | 16 | Normal Wear |
| c | 1.1 | 89.4 | 0.60 | 0.40 | 1.3 | 0.74 | 0.44 | 0.38 | 0.63 | Dispersed (12) | 9.3 | 20 | Normal Wear |
| d | 1.4 | 88.0 | 0.93 | 0.45 | 2.1 | 0.78 | 0.45 | 0.22 | 0.60 | Dispersed (11) | 9.9 | 21 | Normal Wear |
| e | 0.3 | 91.8 | 0.02 | 0.41 | 0.6 | 0.85 | 0.52 | 0.52 | 0.64 | Dispersed (10) | 7.6 | 12 | Normal Wear |
| A | 1.0 | 74.8 | 0.34 | 0.53 | 5.3 | 0.65 | 0.41 | 0.18 | 0.52 | Dispersed (12) | 19.9 | 38 | Great Wear |
| B | 1.0 | 78.9 | 0.22 | 0.55 | 3.5 | 0.62 | 0.40 | 0.74 | 0.55 | Dispersed (10) | 17.6 | 35 | Great Wear |

TABLE 1-continued

| | Cemented Carbide | | | | | | | | | | | Cutting Test | |
|---|---|---|---|---|---|---|---|---|---|---|---|---|---|
| | First Hard Phase Grains | | Second Hard Phase Grains | | | | | | | | Binder Phase | | |
| | | | | | | Core Portion Composition $Ti_{x1}W_{1-x1}C_{1-y1}N_{y1}$ | | Rim Portion Composition $Ti_{x2}W_{1-x2}C_{1-y2}N_{y2}$ | | | | | |
| Sample | D50 (μm) | Volume % | D50 (μm) | D10/D90 | Volume % | x1 | y1 | x2 | y2 | Dispersed/Uneven (Number) | Volume % | Wear Amount (μm) | Cutting Edge State |
| C | 1.0 | 80.5 | 1.10 | 0.52 | 4.1 | 0.58 | 0.38 | 0.15 | 0.45 | Dispersed (14) | 15.4 | 33 | Great Wear |
| D | 1.0 | 81.1 | 0.89 | 0.51 | 2.9 | 0.55 | 0.35 | 0.12 | 0.40 | Uneven (18) | 16.0 | 32 | Great Wear |
| E | 1.0 | 85.8 | 0.54 | 0.56 | 3.2 | 0.57 | 0.35 | 0.13 | 0.43 | Uneven (17) | 11.0 | 37 | Great Wear |
| F | 1.7 | 89.0 | 0.70 | 0.44 | 2.1 | 0.71 | 0.44 | 0.35 | 0.48 | Dispersed (11) | 8.9 | 24 | Normal Wear |
| G | 1.0 | 88.6 | 0.65 | 0.48 | 1.0 | 0.78 | 0.44 | 0.29 | 0.45 | Dispersed (13) | 10.4 | 26 | Normal Wear |
| H | 1.0 | 83.5 | 0.58 | 0.45 | 4.4 | 0.72 | 0.43 | 0.31 | 0.47 | Dispersed (14) | 12.1 | 28 | Normal Wear |
| I | — | — | — | 0.37 | — | — | | — | | — | — | Drill Fractured | |
| J | 0.5 | — | 0.20 | 0.58 | — | 0.68 | 0.14 | 0.11 | 0.12 | — | — | Drill Fractured | |

<Review>

The cemented carbides of samples a to e and samples F to H correspond to examples of the present disclosure. The cemented carbides of samples A to E, sample I and sample J correspond to comparative examples. It was confirmed that each of the drills composed of the cemented carbides of samples a to e and samples F to H (examples of the present disclosure) has a smaller wear amount than each of the drills composed of the cemented carbides of samples A to E, sample I and sample J (comparative examples), and has excellent wear resistance and long tool life even in high-speed processing.

The cemented carbide of sample I corresponds to a comparative example. In the drill composed of the cemented carbide of sample I, the drill itself was fractured before forming 10000 holes. This is presumably due to the following reason: when the metal carbonitride powder is used as a source material, the source material powder of the second hard phase grains is likely to be coarse and aggregated in the sintering step. Further, this is also presumably due to the following reason: when the coarse-particle WC powder is used as a source material, the dispersibility of the second hard phase grains is decreased.

The cemented carbide of sample J corresponds to a comparative example. In the drill composed of the cemented carbide of sample J, the drill itself was fractured before forming 10000 holes. This is presumably due to the following reason: when the metal oxide powder is used as a source material, oxygen remains in the cemented carbide to decrease the strength of the cemented carbide. Further, this is also presumably due to the following reason: when a carbon source for the second hard phase grain is only the blended carbon, the sintered material structure become inhomogeneous and is decreased in strength due to residual carbon having not been incorporated into the second hard phase grains.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: first hard phase grain; 2: second hard phase grain; 21: core portion; 22: rim portion; 3: binder phase; L1: arbitrary line passing through center of gravity X of second hard phase grain; a1 to a8: measurement point; R: unit region

The invention claimed is:

1. A cemented carbide comprising a hard phase and a binder phase, wherein the hard phase has first hard phase grains and second hard phase grains, each of the first hard phase grains is composed of tungsten carbide, a second hard phase grain includes a core portion and a rim portion that covers at least a portion of the core portion, a composition of the core portion is represented by $M1_{x1}W_{1-x1}C_{1-y}N_{y1}$, the M1 is at least one metal element selected from a group consisting of a group 4 element, a group 5 element in a periodic table, chromium and molybdenum, the x1 is 0.70 or more and 1.00 or less, the y1 is 0 or more and 0.90 or less, a composition of the rim portion is represented by $M2_{x2}W_{1-x2}C_{1-y2}N_{y2}$, the M2 is at least one metal element selected from a group consisting of a group 4 element, a group 5 element in the periodic table, chromium and molybdenum, the x2 is 0.20 or more and less than 0.70, the y2 is 0 or more and 0.90 or less, the binder phase includes at least one iron group element selected from a group consisting of iron, cobalt, and nickel, a 50% cumulative number grain size of the second hard phase grains is 0.01 μm or more and 1.0 μm or less, in the cemented carbide, the number of unit regions R in each of which a percentage of the number of the second hard phase grains with respect to a total number of the second hard phase grains in a total of 48 unit regions R is less than 0.5% or is more than 5% is 14 or less among the total of 48 unit regions R, and the total of 48 unit regions R are provided by arranging six unit regions R in a longitudinal direction and eight unit regions R in a lateral direction in an electron microscope image of the cemented carbide at an observation magnification of 10000×, each of the unit regions R being in a form of a square having each side of 1.5 μm.

2. The cemented carbide according to claim 1, wherein the x1 is 0.80 or more and 1.00 or less, and the x2 is 0.40 or more and less than 0.70, and the 50% cumulative number grain size of the second hard phase grains is 0.01 μm or more and 0.5 μm or less.

3. The cemented carbide according to claim 1, wherein a 50% cumulative number grain size of the first hard phase grains is 0.1 μm or more and 1.5 μm or less.

4. The cemented carbide according to claim 1, wherein the cemented carbide does not include one or both of chromium and vanadium.

5. The cemented carbide according to claim 1, wherein the second hard phase grains exist dispersedly.

6. The cemented carbide according to claim 1, wherein a content ratio of the first hard phase grains of the cemented carbide is 80 volume % or more and 99 volume % or less, a content ratio of the second hard phase grains of the cemented carbide is 0.2 volume % or more and 3.0 volume % or less, and a content ratio of the binder phase of the cemented carbide is 0.5 volume % or more and 19.8 volume % or less.

7. The cemented carbide according to claim 1, wherein the cemented carbide consists of the hard phase, the binder phase, and an inevitable impurity, a content ratio of the first hard phase grains of the cemented carbide is 80 volume % or more and 99 volume % or less, and a content ratio of the second hard phase grains of the cemented carbide is 0.2 volume % or more and 3.0 volume % or less.

8. A cutting tool comprising the cemented carbide according to claim 1.

9. The cemented carbide according to claim 1, wherein the cemented carbide is prepared by:

preparing source material powders, the source material powders including tungsten carbide powder, a metal hydride powder of the at least one metal element selected from a group consisting of a group 4 element in the periodic table, a group 5 element in the periodic table, chromium, and molybdenum, a graphite powder, and an iron group element powder, mixing the source material powders to prepare a mixed powder, molding the mixed powder to prepare a molded powder, sintering the molded powder to prepare a sintered powder, and cooling the sintered powder.

10. The cemented carbide according to claim 9, wherein an average particle size of the metal hydride powder is 0.1 μm or more and 1.0 μm or less.

11. The cemented carbide according to claim 9, wherein sintering the molded powder includes:

heating at a temperature of 1350° C. to 1500° C. for 60 to 120 minutes under a mixed gas atmosphere including nitrogen gas and carbon monoxide gas, and heating at a temperature of 1350° C. to 1500° C. and being fed with a pressure of more than 10 kPa and 30 kPa or less for 60 to 120 minutes under nitrogen gas.

* * * * *